(12) United States Patent
Zanardelli

(10) Patent No.: US 7,729,826 B2
(45) Date of Patent: Jun. 1, 2010

(54) COMPUTER SYSTEM AND METHOD FOR MONITORING HYDROGEN VEHICLES

(75) Inventor: Vance Peter Zanardelli, Bloomfield Hills, MI (US)

(73) Assignee: Ford Motor Company, Dearborn, MI (US)

( * ) Notice: Subject to any disclaimer, the term of this patent is extended or adjusted under 35 U.S.C. 154(b) by 584 days.

(21) Appl. No.: 11/720,366

(22) PCT Filed: Dec. 1, 2005

(86) PCT No.: PCT/US2005/043575

§ 371 (c)(1),
(2), (4) Date: May 29, 2007

(87) PCT Pub. No.: WO2006/060633

PCT Pub. Date: Jun. 8, 2006

(65) Prior Publication Data

US 2008/0234888 A1    Sep. 25, 2008

Related U.S. Application Data

(60) Provisional application No. 60/593,041, filed on Dec. 2, 2004.

(51) Int. Cl.
*G01M 17/00*    (2006.01)
(52) U.S. Cl. ...................................... 701/33
(58) Field of Classification Search .............. 701/33
See application file for complete search history.

(56) References Cited

U.S. PATENT DOCUMENTS

| | | | |
|---|---|---|---|
| 5,596,261 A * | 1/1997 | Suyama | 320/152 |
| 6,594,579 B1 | 7/2003 | Lowrey et al. | |
| 6,611,740 B2 | 8/2003 | Lowrey et al. | |
| 6,711,474 B1 | 3/2004 | Treyz et al. | |
| 6,721,644 B2 | 4/2004 | Levine | |

(Continued)

FOREIGN PATENT DOCUMENTS

GB    2390438 A    7/2004

(Continued)

OTHER PUBLICATIONS

"Earthtoys Alternative Energy Library-Emagazine;" <http://www.earthtoys.com/emagazine.php?issue_number=04.04.01article=thundervolt>.

(Continued)

*Primary Examiner*—Thomas G Black
*Assistant Examiner*—Shelley Chen
(74) *Attorney, Agent, or Firm*—Brooks Kushman P.C.

(57) ABSTRACT

A system and method for remotely monitoring the status of a hydrogen vehicle includes a data acquisition/communication module configured to receive a plurality of signals representing one or more status conditions associated with the vehicle. The data acquisition/communication module is further configured to report one or more of the status conditions to a computer remote from the vehicle. The system is further configured to receive one or more signals from the remote computer in response to the reported status condition wherein the received signal represents an action to be taken in response to the one or more status conditions. The data acquisition/communication module is also configured to initiate the action to be taken. A computer remote from the vehicle is configured to monitor the one or more status conditions reported by the data acquisition/communication module and determine if an action must be taken.

14 Claims, 2 Drawing Sheets

U.S. PATENT DOCUMENTS

| | | |
|---|---|---|
| 6,732,031 B1 | 5/2004 | Lightner et al. |
| 6,732,032 B1 | 5/2004 | Banet et al. |
| 6,745,105 B1 * | 6/2004 | Fairlie et al. ................ 700/273 |
| 6,810,925 B2 * | 11/2004 | Graham et al. ................ 141/98 |
| 7,610,122 B2 * | 10/2009 | Anderson ...................... 701/2 |
| 2003/0055666 A1 * | 3/2003 | Roddy et al. ................... 705/1 |
| 2003/0083848 A1 | 5/2003 | Kami |
| 2003/0171111 A1 | 9/2003 | Clark |
| 2004/0016769 A1 | 1/2004 | Redmond |
| 2004/0024502 A1 | 2/2004 | Squires et al. |
| 2004/0039504 A1 * | 2/2004 | Coffee et al. .................. 701/35 |
| 2004/0062963 A1 | 4/2004 | Umayahara et al. |
| 2004/0167689 A1 * | 8/2004 | Bromley et al. ............... 701/29 |
| 2004/0194479 A1 | 10/2004 | Umebayashi et al. |
| 2006/0289213 A1 * | 12/2006 | Cervantes .................. 180/65.3 |

OTHER PUBLICATIONS

"Networkcar Wins Telematics Contract with Toyota Motor Sales;" <http://www.networkcar.com/networkcar/pub/pressrelease003>.

"Team Fate-UC Davis" <http://www.team-fate.net/sequoiatele.html>.

"thunderVolt Drive System Overview Vehicle Control Systems;" <http://www.isecorp.com/ise_hybrid-electric-technology-benefits/thundervolt_drive_system/thundervolt>.

* cited by examiner

COMPUTER SYSTEM AND METHOD FOR MONITORING HYDROGEN VEHICLES

CROSS-REFERENCE TO RELATED APPLICATIONS

This application claims the benefit of U.S. provisional patent application Ser. No. 60/593,041 filed Dec. 2, 2004, entitled "COMPUTER SYSTEM AND METHOD FOR MONITORING HYDROGEN VEHICLES," the entire contents of which is hereby incorporated by reference.

TECHNICAL FIELD

The present invention relates generally to hydrogen vehicles and more specifically to monitoring hydrogen vehicles.

BACKGROUND

Alternative fuel vehicles have experienced significant attention in view of the increased demand and short supply of natural resources conventionally used to power vehicles, imbalanced distribution of resource supplies relative to distribution of resource consumptions, and concern over emissions of carbon dioxide which result from the burning of fossil fuels. Particularly, hydrogen has been utilized as an alternative fuel source for vehicles. However, hydrogen fueled vehicles require diligent monitoring as a result of government regulations and hydrogen properties. As increased numbers of hydrogen fueled vehicles are placed in operation, it is likely regulations will be expanded that restrict or otherwise govern their use. Also, building codes and other standards will likely be modified to accommodate hydrogen fueled vehicles in public and residential areas. As a result, it is important for an operator of a hydrogen vehicle to be aware of possible regulatory violations and/or vehicle operating parameters. Thus, there exists a need for a system that can perform remote diagnostic and prognostic analyses of hydrogen powered vehicles.

SUMMARY

A system and method for remotely monitoring the status of a hydrogen vehicle is disclosed. The system includes a data acquisition/communication module configured to receive a plurality of signals representing one or more status conditions associated with the vehicle and report one or more of the status conditions to a computer remote from the vehicle. The system is further configured to receive one or more signals from the remote computer in response to the reported status condition wherein the received signal represents an action to be taken in response to the one or more status conditions. The data acquisition/communication module is also configured to initiate the action to be taken. A computer remote from the vehicle is disclosed that is configured to monitor the one or more status conditions reported by the data acquisition/communication module to determine if an action must be taken. A computer is also configured to transmit a signal representing the action to be taken upon determination that an action must be taken. The computer is further configured to monitor one or more reported status conditions to automatically detect a release of hydrogen.

The method for remotely monitoring hydrogen vehicle status includes sensing a plurality of vehicle status criteria relating to the operation of the hydrogen vehicle and transmitting the signal representing one or more of the status criteria to a computer remote from the vehicle. The method includes processing the one or more status criteria at the computer remote from the vehicle to determine if an action must be taken to alleviate a problem condition wherein the problem to be alleviated is a release of hydrogen. The method further includes automatically selecting one or more actions to be taken to alleviate a problem condition and transmitting the signal representing the one or more actions to be taken to a module on-board the vehicle wherein the module is configured to initiate the one or more actions to be taken. The automatically selected action may take into account the presence of one or more remotely monitored vehicles in an area where restrictions on the amount of hydrogen are in effect.

DETAILED DESCRIPTION OF THE PREFERRED EMBODIMENT(S)

Figure 1:
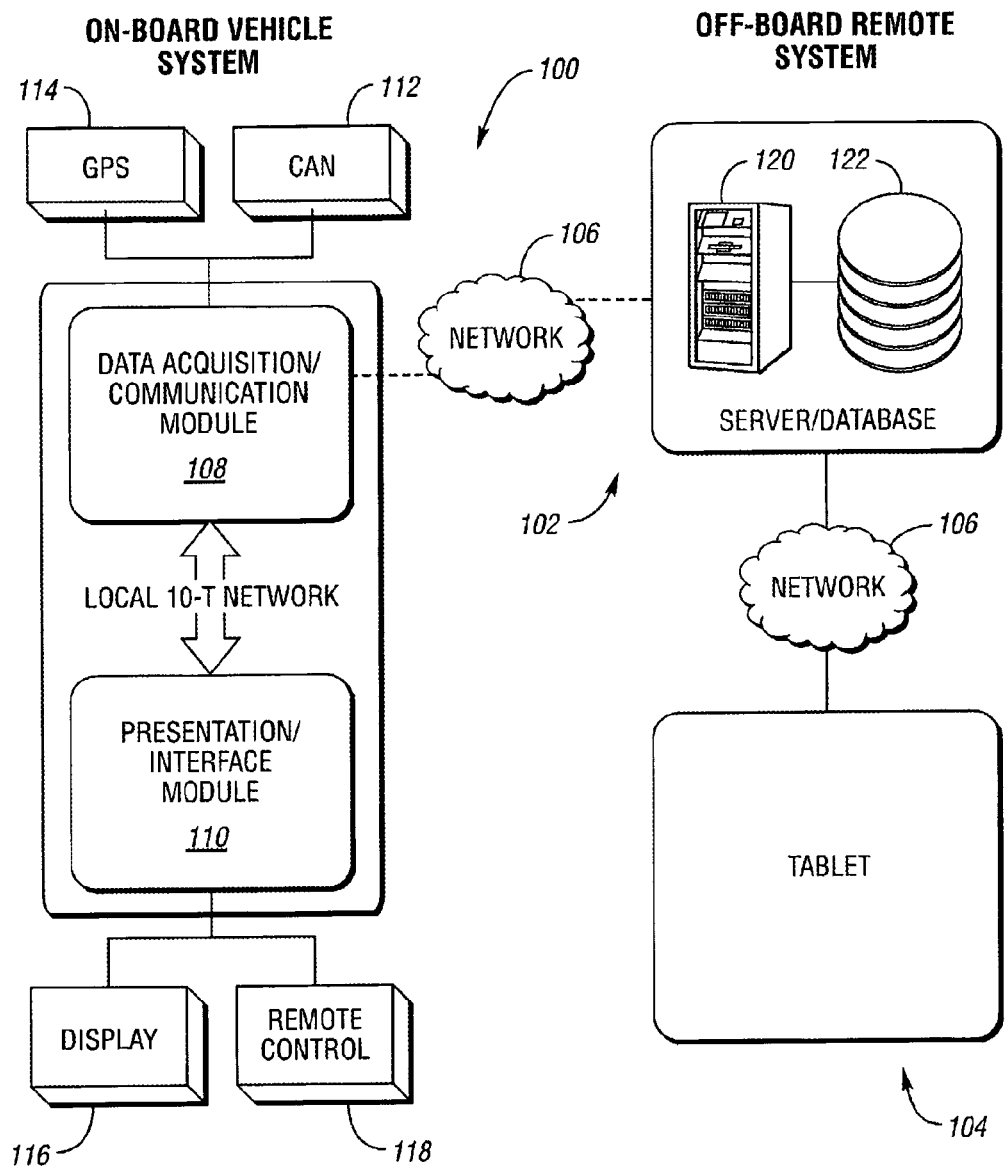
FIG. 1 is a schematic diagram illustrating an example system embodiment of the present invention.

FIG. 1 illustrates one embodiment of the present invention. The content or arrangement of FIG. 1, or any embodiment presented herein, is not offered to limit the scope of the present invention. Embodiments of the present invention may be modified or adapted to best-fit a particular implementation.

According to the embodiment shown in FIG. 1, a system architecture may comprise an on-board vehicle system 100, an off-board remote system 102, and a tablet system 104. Preferably, these systems communicate with each other over a wireless network 106 such as a cellular communication network. Preferably, any cellular communication is of sufficient power (e.g. 3 watts or more) to enable communication in remote geographical areas. Of course, several different modes of communication may be implemented within the scope of the present invention, including a satellite communication network, a local area network, a wide area network, or the Internet.

The on-board vehicle system 100 may include a data acquisition/communication module 108 and a presentation interface module 110. These modules may be combined as one, or sub-divided into sub-modules or components. Data and signal processing may take place in any module and/or, as described in greater detail below, at a computer located remote from the vehicle. The manner and location of where data/signal processing occurs may vary depending on the particular implementation of the present invention.

The data acquisition/communication module 108 may include one or more computers that receive vehicle information from a vehicle network such as a controller area network ("CAN") 112. Other inputs may be provided. The data acquisition/communication module 108 may receive information transmitted by a plurality of other on-board modules including a powertrain control module ("PCM"), an alternative fuel control module ("AFCM"), an energy management module ("EMM"), etc.

The received information may represent a plurality of status conditions associated with the hydrogen-powered vehicle, including without limitation vehicle location, vehicle speed, engine RPM, fuel injector pulse width, mass air flow rate (engine load may be inferred), fuel consumption rate, manifold absolute pressure, equivalence ratio, hydrogen tank pressure, hydrogen tank temperature, NOx, and CO2. The NOx and CO2 may be measured at multiple vehicle locations, including feedgas, between the three-way catalyst and NOx trap, and at the tailpipe.

According to one embodiment, the data acquisition/communication module 108 transmits some or all of the received information to the off-board remote system 102. The transmitted information may be processed or re-formatted prior to transmission. The data acquisition/communication module 108 may also transmit a request for information to the off-board remote system. As described in greater detail below, the requested information may include refueling station information, destination information, etc. As also described below, the data acquisition/communication module 108 may receive and process information transmitted by the off-board remote system 102.

Information received by the data acquisition/communication module 108 may be transmitted to the presentation interface module 110 for display. This information may be processed to generate a character or graphic-based display. A plurality of different displays may be generated, including without limitation a display of information useful for service personnel to diagnose and service the hydrogen-powered vehicle.

The presentation interface module 110 may be PC-based and may communicate with the data acquisition/communication module 108 over a local network, such as a 10-T or 100-T network. Other means of communication may be provided.

The presentation interface module 110 may support a display 116 for communicating vehicle status information and, as described in greater detail below, information received from the off-board remote system 102. The display 116 may also be configured to display multimedia including without limitation maps, video, advertising information, destination information, distance information, refueling station information, etc. Refueling station information may include location, nearest location, directions, hours of operation, quantity of fuel available, fuel price, etc. Similar information may be provided for other destinations and associated goods or services.

To report available hydrogen fuel quantities, hydrogen fueling stations may be equipped with appropriate transmitters that communicate fuel quantity information to the on-board systems 100, the remote system 102, or other computers in operable communication with the remote system 102.

Vehicle status information may be displayed based on current and historical statistics. Additionally, the operator may define periods for which to display the information, such as trip data including without limitation distance/route traveled, elapsed time, fuel consumption, etc. Information may be displayed in a plurality of graphical formats including dials, bar charts, etc. Control of display functionality may be enabled using a touch-sensitive screen 116 or remote control 118.

The off-board remote system 102 receives information transmitted by the on-board vehicle system 100. The remote system 102 may comprise a computer server 120 having associated application software (not shown) and database 122. Data and signal processing may take place at the remote system 102 and/or at the vehicle system described above. The manner and location of where data/signal processing occurs may vary depending on the particular implementation of the present invention.

Figure 2:
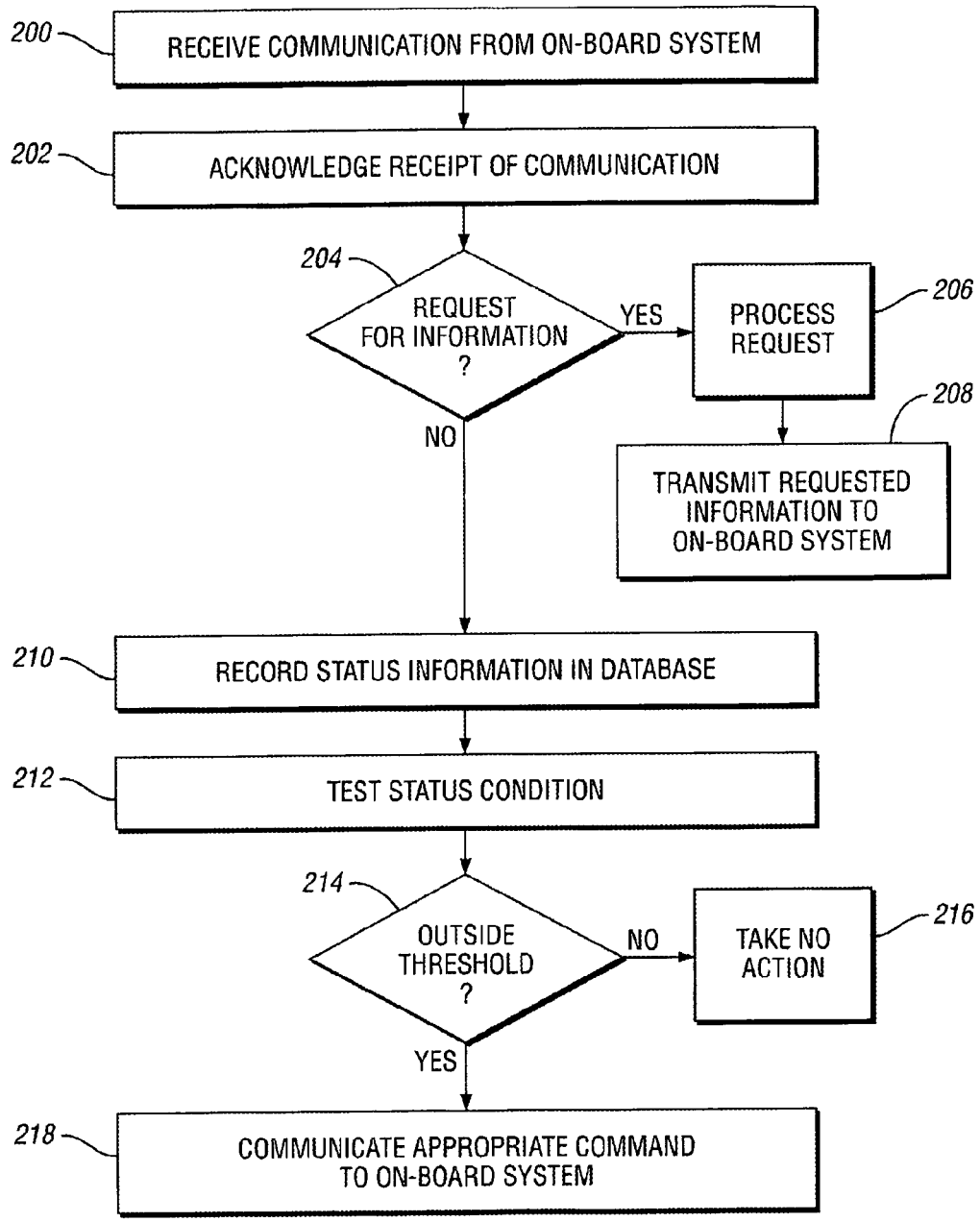
FIG. 2 is a flow diagram illustrating an example process that may be executed in application software in accordance with one embodiment of the present invention.

FIG. 2 is a block flow diagram illustrating an example process that may be executed in software running at the remote system 102. Of course, the process may be modified or adapted to fit a particular implementation of the present invention.

Upon receiving information transmitted by the on-board vehicle system 100, as represented in block 200, the remote system 102 may transmit an acknowledgment. This feature helps to ensure that the on-board vehicle system 100 and the remote system 102 are in communication. If no acknowledgment is received, the on-board vehicle system 100 may retransmit the original message. The on-board vehicle system 100 may additionally, or upon an unsuccessful retransmission, sound an alarm or otherwise notify the operator of the hydrogen-powered vehicle that communication with the remote system has been lost. The on-board vehicle system 100 may queue messages up to a configurable limit while attempting to reestablish communication. Once communication is re-established, the queue can be emptied using a higher message transmission rate. In this manner, loss of data is prevented during events such as passage through a tunnel where communication may not be possible.

If the received communication is a request for information, as determined at block 204, the request for information is processed as represented by block 206. Requested information, if available, is transmitted back to the on-board vehicle system 100 for display or processing.

If the received communication is a transmission of vehicle status information, the information may be recorded in database 122, as represented by block 210. Preferably, any recorded information is identified by or associated with a date, time, vehicle, etc.

As represented by block 212, the vehicle status information may be automatically tested to determine if the vehicle status is within a normal or acceptable threshold. As discussed in greater detail below, a plurality of status/test arrangements may be implemented.

If vehicle status is within a normal or acceptable threshold as determined at block 214, no action may be taken as represented in block 216. If, however, vehicle status is outside a normal or acceptable threshold, one or more actions may be taken. For example, an alarm or recording may automatically sound or an icon may be illuminated on the display 116 of the vehicle. The recording or display may provide the operator of the vehicle with instructions on what to do to alleviate or reduce the impact of any problem. For example, the instructions may be to pull the vehicle off the road, turn the vehicle off, directions to drive the vehicle out of a restricted area, or directions to drive the vehicle to an appropriate area.

Other actions may involve directly controlling aspects of the hydrogen vehicle without any operator intervention. For example, the engine or the fuel tank supply valve may be shut off, or vehicle speed may be reduced or otherwise limited. Remote vehicle control may be predefined and depend on various parameters including the location of the vehicle, the location of restricted areas, the amount of fuel on board, current driving conditions etc. According to one embodiment of the present invention, the on-board system 100 and/or the remote system 102 may be configured to detect a release of hydrogen at the vehicle. Hydrogen release may be detected based on data collected from on-board sensors including hydrogen tank pressure sensors, tank temperature sensors, hydrogen presence of concentration sensors, etc. Hydrogen release may also be detected using engine related parameters including fuel rail pressure, temperature, injector pulse width (s), engine RPM, vehicle speed, etc. alone or in combination with the aforementioned on-board sensors.

An example algorithm for detecting a hydrogen release includes calculating the hydrogen mass in the on-board hydrogen tank based on tank pressure, temperature, and the known thermodynamic properties of gaseous hydrogen. Next, the hydrogen fuel mass consumed may be calculated based on engine related parameters, including fuel injector flow characteristics, and hydrogen thermodynamic properties. Over a standard period of time (e.g. one minute) the reduction of tank fuel mass may be compared with the amount of fuel mass consumed by the engine according to these calculations. If, over the standard time interval, the stored fuel mass reduction minus the fuel mass consumed exceeds a predefined threshold, a hydrogen release may exist.

A hydrogen release may also be detected when the engine is turned off. Here, stored fuel masses in the hydrogen storage tank, intermediate pressure manifold or the engine fuel rail at the beginning and the end of a predefined time interval may be detected and compared. Accordingly, communication of stored fuel masses from the on-board vehicle system to the remote system may take place at predetermined short time intervals when the vehicle is parked in order to conserve vehicle power. If the stored fuel mass decreases during the time interval when the engine is not running, a hydrogen release may exist.

If a hydrogen release is detected, a variety of actions may be implemented. For example, the driver of the vehicle may be automatically notified that a hydrogen release has been detected. Notifications may be by alarm, by visual indicator on a display, an audio message, etc. If a detected release has a rate less than some predefined threshold, the driver may be directed to the nearest repair using vehicle and repair facility position information. The appropriate repair facility may be automatically alerted that a vehicle having a possible hydrogen release condition will be arriving for repair.

If the detected hydrogen release has a rate greater than a predefined threshold, the driver may be directed to pull off the road and stop the engine. A repair facility, emergency responders, etc., may be contacted in an automatic or manual fashion.

If the vehicle is located in or about to enter a closed or poorly ventilated area, such as a tunnel or parking structure, appropriate personnel may automatically be notified of the existence, magnitude and location of the hydrogen release. If the vehicle is located in an open, well ventilated area, the fuel tanks may be commanded, manually or automatically, to vent the hydrogen fuel in a safe and controlled manner. Additionally, a de-fueling vehicle may be dispatched, manually or automatically, to extract hydrogen fuel remaining on-board the vehicle.

Another vehicle condition that may be monitored locally or remotely is hydrogen fuel level. Using data collected from tank pressure sensors, temperature sensors, known tank volume, fuel consumption calculations, vehicle location, etc., a predicted time at which vehicle refueling is necessary may be determined. This information may be calculated in an automatic fashion and displayed to the vehicle operator. Additionally, one or more alarms may sound indicating that on-board fuel is low and that refueling is necessary. Notably, this alert may be based on the location of the vehicle, the distance to the nearest hydrogen refueling station, the desired destination, average driving characteristics, etc.

Appropriate sensors at hydrogen refueling stations may be configured to detect the amount of hydrogen fuel available at those stations, and transmit the amount of available hydrogen fuel to the remote system 102 and/or the on-board system 100. This information may be used to locate the most suitable hydrogen refueling station for a particular vehicle location, destination, etc. The on-board system 100 may be configured to display directions to the nearest refueling station, prices, etc. The refueling station sensors and/or the remote system 102 may be configured to monitor or transmit available fuel levels to notify fuel suppliers when particular fuel station hydrogen levels are low or below a predefined level.

The remote system 102 may also detect, based on reported vehicle parameters, that a hydrogen vehicle has run out of fuel remote from a refueling station. A mobile refueling vehicle may be automatically or manually dispatched to the stranded hydrogen vehicle.

Because certain regulatory agencies or municipalities may regulate an amount of hydrogen fuel per geographic area, e.g. within a given parking lot, parking structure, or city center, an embodiment of the present invention may be configured to detect the amount of hydrogen on-board all hydrogen-powered vehicles within a regulated geographic area. If the hydrogen concentration for that geographical area is near or above acceptable limits, appropriate actions may be initiated. For example, a signal may be sent to certain on-board systems 100 notifying vehicle operators of the condition. Driving instructions for leaving or detouring around the restricted area may be provided to the operator. In the event a hydrogen density limit is exceeded and cannot be appropriately alleviated, appropriate responders may be notified in a manual or automatic fashion.

Regulatory agencies or municipalities may also regulate, prohibit, or otherwise restrict the presence of stored hydrogen or hydrogen vehicles in certain areas, e.g. tunnels, parking garages or other enclosed structures. Based on the geographical location of these areas, and reported hydrogen vehicle position information, an embodiment of the present invention may be configured to automatically notify the vehicle operator of the existence and location of such areas, and provide appropriate instructions or directions for avoiding and detouring around such areas.

In the event that an operator ignores such a warning, or a hydrogen powered vehicle is otherwise located in such a restricted area, a variety of other measures may be taken including contacting appropriate responders, instructing the vehicle operator to pull off the road and turn off the vehicle, and remotely powering down or otherwise disabling the vehicle.

It is recognized that oil consumption by a hydrogen-powered internal combustion engine equipped vehicle is important because it may signal engine trouble and/or produce emissions of carbon dioxide and hydrocarbons. Excessive oil consumption by a hydrogen-powered vehicle may be detected based on reported vehicle parameters including without limitation exhaust $CO_2$, engine RPM, torque, mass airflow, equivalence ratio, etc. The actual mass emissions of exhaust $CO_2$ may be compared to expected exhaust $CO_2$ mass flow based on dynamometer measurements. If actual exhaust $CO_2$ exceeds a predefined threshold, a signal indicating that excessive oil consumption is occurring may be generated. In such a case, a driver may be automatically notified of the probable existence of excessive oil consumption, and instructions to the closest capable repair facility may be provided. Additionally, an appropriate repair facility may be manually or automatically notified that such a vehicle condition exists, and that a vehicle will be arriving for repair.

Based on data such as vehicle position information, speed information, calibration settings, exhaust $CO_2$, exhaust $NO_x$, etc., the exhaust air quality of the vehicle may be calculated and compared with known air quality regulations in different geographical regions (e.g. city center, air quality control zone, green state restriction, rural conditions, etc.). If current exhaust air quality calculations for the vehicle do not indicate that the exhaust air quality meets or exceeds the appropriate regulation, engine operating conditions may be automatically adjusted to improve exhaust air quality to an appropriate level. Adjustments may be initiated locally at the vehicle or from the remote system 102. For example, engine air fuel ratio may be varied relative to stoichiometric conditions. Additionally, lean $NO_x$ trap purge cycle and timing may be regulated to minimize $NO_x$ emissions within regulated areas.

Vehicle load may be estimated based on vehicle data including throttle position, vehicle position, speed, acceleration and GPS vertical position (e.g. calculation of grade). For example, actual acceleration based upon vehicle speed and position changes may be compared to expected acceleration from throttle position to estimate vehicle load. This vehicle load may be compared to vehicle load restrictions in certain geographical areas. If the vehicle load exceeds the maximum acceptable load for a particular geographical area, the driver and/or appropriate authorities may be automatically or manually notified.

Vehicle parameters may also be collected, analyzed and acted on locally at the vehicle on board system 100, with or without involvement of the remote system 102.

Information stored in the database 122 may be used to perform a plurality of data analyses, diagnosis and prognosis. This information may be made accessible to field personnel having an interface tablet 104. Field personnel may access and query database 122 to monitor vehicle status and behavior.

Collected data may indicate real-world driving patterns and conditions for hydrogen-fueled vehicles. This information may be useful for determining vehicle mean time to failure, miles to failure, failure modes, durability, customer acceptance, driver behavior, operating conditions, etc. Driving patterns may be used to more effectively develop and locate fuel stations, repair garages, etc.

Criteria relevant to hydrogen engine development challenges and innovations may also be monitored. For example, because hydrogen fuels lack lubrication, valve and valve seat durability may be determined based on a comparison between expected and actual vehicle torque. CO2 criteria may be monitored to determine oil consumption. Monitoring of injector pulsewidth and fuel consumption may indicate fuel injector sticking.

Tablet system 104 may communicate with the remote system 102 to retrieve information for individual vehicles or vehicle fleets. Remote system 102 may also transmit information to the tablet 104 in an automatic fashion. For example, an alert may be communicated to a tablet system communicating a particular condition, or instructions for reacting to such a condition.

The tablet system 102 may be used by field personnel for tracking, reporting, diagnosing and servicing hydrogen powered vehicles. The tablet system may also be used by fleet managers, law enforcement officials, emergency responders, etc.

While the above embodiments are described with respect to a hydrogen-powered vehicle, it is recognized by those in the art that embodiments of the present invention are equivalently applicable to vehicles deriving power from hydrogen combustion, hydrogen fuel cells, or hybrid power systems that include hydrogen.

While the best mode for carrying out the invention has been described in detail, those familiar with the art to which this invention relates will recognize various alternative designs and embodiments for practicing the invention.

What is claimed:

1. A computer system for remotely monitoring hydrogen vehicle status, the system comprising:
    in a hydrogen-powered vehicle, a data acquisition/communication module configured to (i) receive a plurality of signals representing one or more status conditions associated with the vehicle, (ii) report one or more of the status conditions to a computer remote from the vehicle, (iii) receive one or more signals from the remote computer in response to the reported status condition(s), the received signal representing an action to be taken in response to the one or more status conditions, and (iv) initiate the action to be taken; and
    a computer remote from the vehicle configured to (i) monitor the one or more status conditions reported by the data acquisition/communication module to determine if an action must be taken, and (ii) upon determining that an action must be taken, transmit a signal representing the action to be taken to the data acquisition/communication module; and (iii) monitor one or more reported status conditions to automatically detect an on-board hydrogen release.

2. The system of claim 1, wherein automatically detecting an on-board hydrogen release includes:
    calculating a hydrogen mass of an on-board hydrogen tank and the hydrogen fuel mass consumed; and
    comparing a reduction in the hydrogen mass of the on-board hydrogen tank and the hydrogen fuel mass for a predetermined time period.

3. The system of claim 1 wherein the computer remote from the vehicle is configured to monitor one or more reported status conditions to automatically detect, based on the nearest hydrogen fueling station, when on-board hydrogen fuel is low.

4. The system of claim 1 wherein the computer remote from the vehicle is configured to monitor one or more reported status conditions to automatically detect when the vehicle is operating in a geographic area having a hydrogen regulation.

5. The system of claim 1 wherein the computer remote from the vehicle is configured to monitor one or more reported status conditions to automatically determine whether the exhaust air quality for the vehicle complies with an exhaust air quality regulation for a location where the vehicle is operating.

6. The system of claim 1 wherein the computer remote from the vehicle is configured to monitor one or more reported status conditions to automatically determine whether the vehicle weight complies with a vehicle weight regulation for a location where the vehicle is operating.

7. The system of claim 1 additionally comprising a presentation module configured to receive and display information representing one or more vehicle status conditions or the action to be taken.

8. The system of claim 7 wherein the presentation module is located on-board the hydrogen-powered vehicle.

9. The system of claim 7 wherein the presentation module operates remote of the hydrogen-powered vehicle.

10. The system of claim 7 wherein the remote computer is additionally configured to (i) calculate one or more statistics based on status reported by the data acquisition/communication module, and (ii) transmit the statistic(s) to the data acquisition/communication module for display on the presentation module.

11. The system of claim 1 wherein the status condition(s) consist of one or more of the following: vehicle location, vehicle speed, vehicle direction, engine RPM, fuel injector pulse width, mass air flow rate, fuel consumption rate, manifold absolute pressure, equivalence ratio, hydrogen tank pressure, hydrogen tank temperature, NOx level, and $CO_2$ level.

12. The system of claim 1 wherein the action includes alerting a vehicle operator of a condition through the use of an audio message or display icon.

13. The system of claim 1 wherein the action includes communicating driving directions to a vehicle operator.

14. The system of claim 1 wherein the action includes adjusting operation of at least one aspect of the hydrogen vehicle.

* * * * *